Jan. 11, 1955   L. P. CROSS   2,698,961
SAUSAGE LINKING METHOD
Original Filed Nov. 12, 1949   7 Sheets-Sheet 2

Fig. 2.

INVENTOR.
Lawrence P. Cross.
BY
Cromwell, Greist & Warden
Attys.

Jan. 11, 1955  L. P. CROSS  2,698,961
SAUSAGE LINKING METHOD
Original Filed Nov. 12, 1949  7 Sheets-Sheet 4

INVENTOR.
Lawrence P. Cross,
BY
Cromwell, Greist & Warden
Attys.

Jan. 11, 1955  L. P. CROSS  2,698,961

SAUSAGE LINKING METHOD

Original Filed Nov. 12, 1949  7 Sheets—Sheet 6

INVENTOR.
Lawrence P. Cross,
BY
Cromwell, Greist & Warden
Attys

Jan. 11, 1955  L. P. CROSS  2,698,961
SAUSAGE LINKING METHOD
Original Filed Nov. 12, 1949  7 Sheets—Sheet 7

INVENTOR.
Lawrence P. Cross,
BY
Cromwell, Greist & Warden
attys.

United States Patent Office 2,698,961
Patented Jan. 11, 1955

2,698,961

SAUSAGE LINKING METHOD

Lawrence P. Cross, Valparaiso, Ind.

Original application November 12, 1949, Serial No. 126,792. Divided and this application February 9, 1954, Serial No. 409,056

5 Claims. (Cl. 17—45)

This invention relates to the manufacture of sausages of the character in which filled or stuffed casings of many feet in length are divided into individual sausages and formed into connected links by twisting the casing at intervals corresponding to the desired length of the sausage.

This application is a division of application Serial No. 126,792, filed November 12, 1949.

It is an object of the invention to provide an improved method for the production of link sausages which comprises dividing a filled casing at predetermined intervals to form individual sausage links of uniform length and automatically rotating successive links in the same direction to provide a twist in the casing in the areas joining the links.

It is another object of the invention to provide a sausage linking method which comprises automatically dividing a filled sausage casing into sections of predetermined length, rotating each successive section to impart a twist in the casing between it and the next succeeding section, and collecting the twisted sections in coil-like fashion in a container as the twisting is completed.

It is a further object of the invention to provide a sausage linking method which comprises continuously feeding a filled sausage casing, constricting the casing at spaced points to divide the same into individual sausage links, rotating each successive link to impart a twist in the constricted area between the links, and collecting the twisted links into a coiled stack.

It is a more specific object of the invention to provide a sausage linking method which comprises continuously feeding a filled sausage casing to cooperating movable divider members for constricting the casing at spaced points to divide the same into individual sausage links, and delivering the links to a rapidly rotating mechanism which imparts a twist in the constricted area between the successive links and which collects the twisted links into a coiled stack.

It is another object of the invention to provide a method of forming from a relatively long length of stuffed casing a series of individual links of uniform length which are separated from each other by twisted casing sections, which method comprises continuously advancing the casing endwise, constricting the casing at intervals while it is being advanced, whereby to divide the casing into link portions, directing each of the thusly divided continuously advancing link portions laterally into a rapidly revolving open-centered coil formed from the preceding link portions, in which coil the link portions are held by centrifugal force against movement relative to each other, and utilizing the end connection of each laterally directed link portion with the revolving link portions preceding it in the coil to effect rotation of the laterally directed link portion relative to the succeeding link portion, whereby to twist the casing therebetween.

It is a still further object of the invention to provide a method of forming a length of filled casing into a series of individual links which are separated from each other by twisted sections of the casing, which method comprises continuously advancing the filled casing in a predetermined path, constricting the casing at intervals without interrupting its movement, whereby to preliminarily divide the filled casing into individual links of predetermined length, guiding the successive links without interruption through a free and unobstructed passageway which passageway is slightly larger in diameter than the diameter of the casing, axially rotating each individual link as it advances through the passageway by guiding the previously twisted links outwardly away from the passageway and causing the twisted links to arrange themselves in an open coil formation, the coil of links being rotated at a high rate of speed to exert a centrifugal pull on the links sufficient to cause them to move outwardly away from the passageway, and the outward movement of the links being limited to cause them to arrange themselves in coil formation.

These and other objects and advantages of the invention will be understood from a consideration of the mechanism which has been devised for carrying out the linking method and which is shown by way of illustration in the accompanying drawings, wherein.

Referrinng to the drawings, there is shown a mechanism which is adapted to form link sausages in accordince with the principles of the invention, and which will divide a continuous length of filled sausage casing into a plurality of links of predetermined length, which will successively rotate each link relative to the remainder of the filled casing to impart a twist between it and the next succeeding link and which will accumulate the twisted links in uniform fashion in a receptacle.

Figure 1:
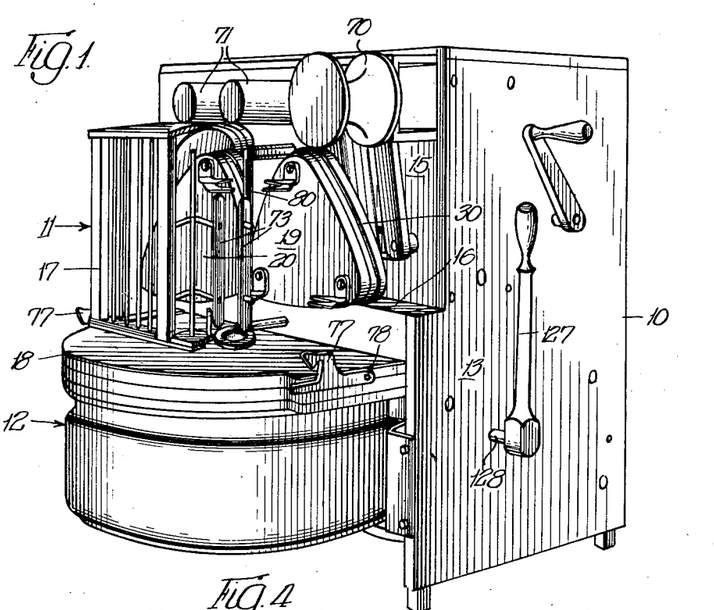
Fig. 1 is a perspective view, with portions broken away, of a machine especially designed for linking sausages in a manner which embodies the principles of the invention.
Figure 2:
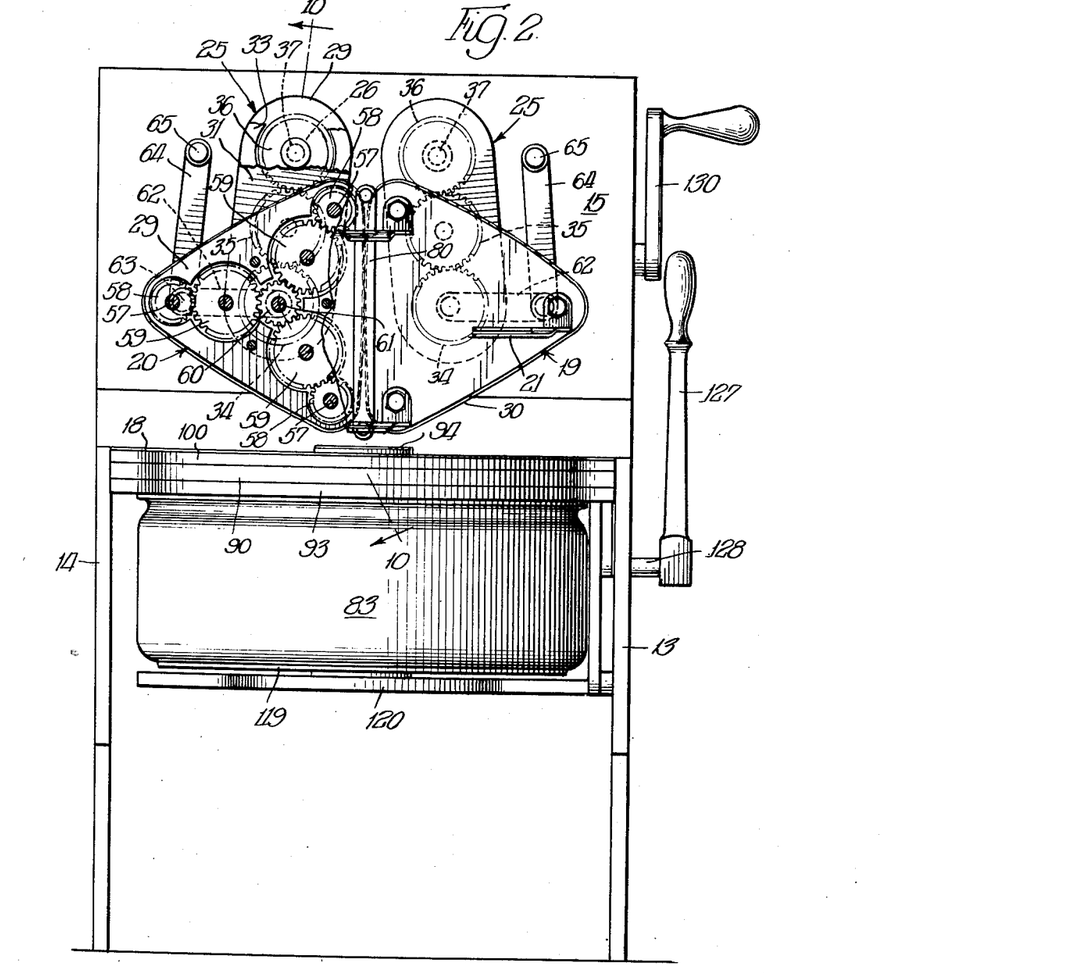
Fig. 2 is a front elevation of the linking machine with the front guard mechanism removed and with portions broken away.
Figure 3:
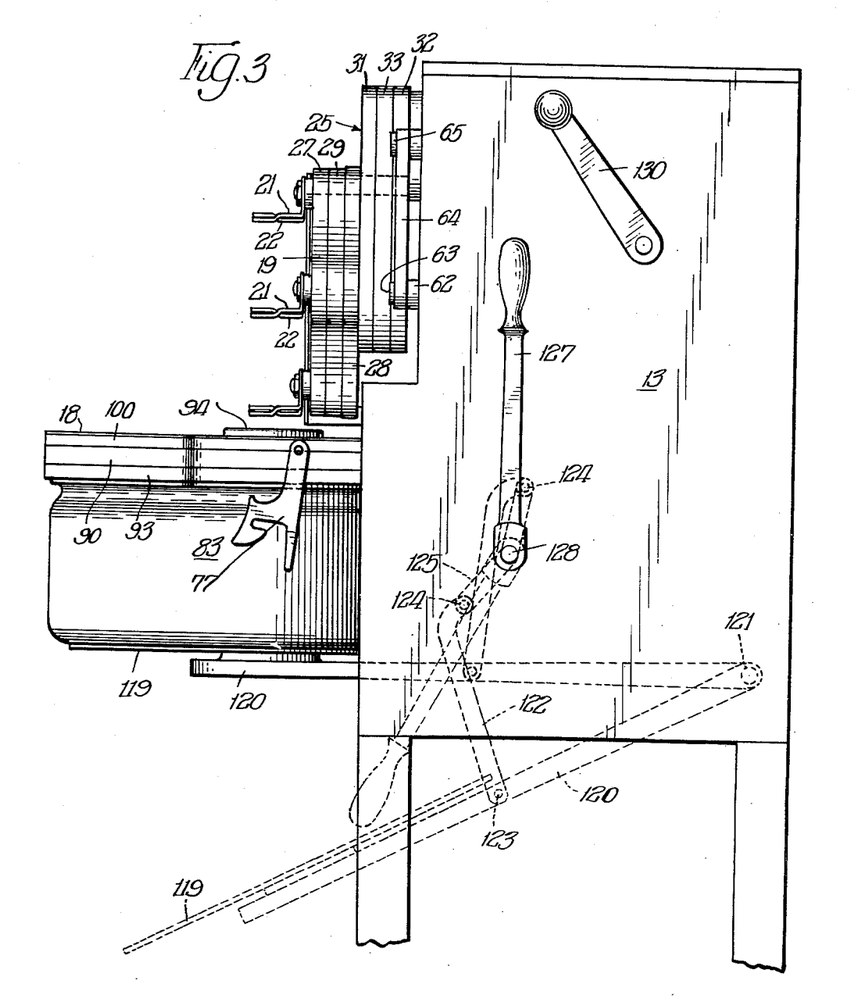
Fig. 3 is a side elevation of the linking machine with the front guard mechanism removed.

The illustrated mechanism (Figs. 1 to 3) comprises an upright supporting frame or housing 10, a dividing mechanism 11 arranged on one vertical face or wall 15 of the housing 10 and a twisting and accumulating mechanism 12 arranged below the dividing mechanism 11, all driven by a motor 105 and cooperating driving elements supported on or housed within the housing 10.

The supporting frame or housing 10 includes laterally spaced vertically extending side wall or plate members 13 and 14, the upper portions of which are connected by a front wall forming plate 15 extending in a vertical plane between the side plates 13 and 14 to approximately half the depth of the latter and terminating at its lower edge at a relatively narrow ledge forming shelf plate 16 which extends in a generally horizontal plane between the side plates 13 and 14.

The mechanism 11 for dividing the filled sausage casing, is arranged on the front wall plate 15 of the housing 10 and includes a fixed guard mechanism 17 which is removably supported on a semi-circular shelf 18 which shelf 18 extends forwardly in a generally horizontal plane a short distance below the ledge 16 and between the side plates 13 and 14.

Figure 11:
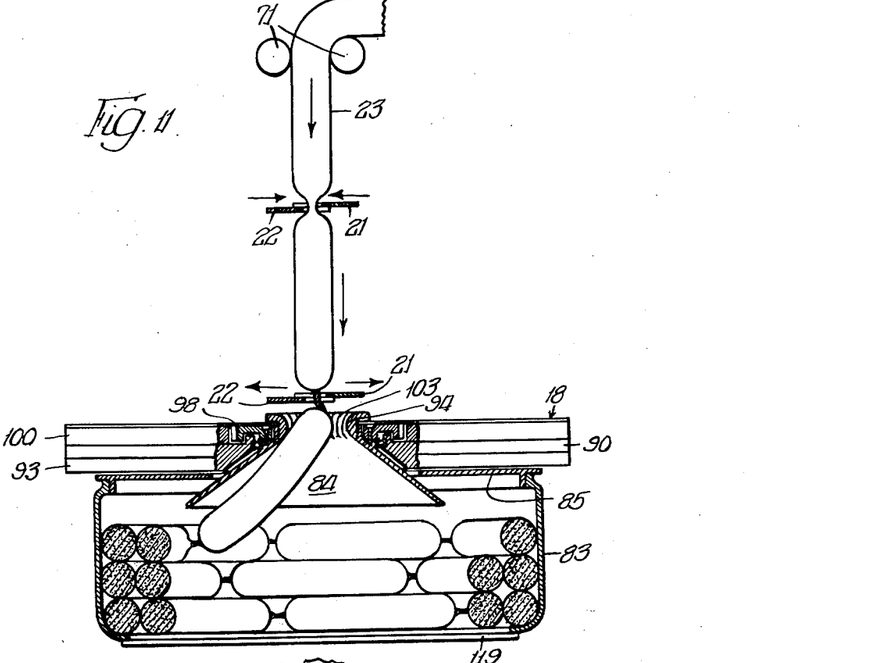
Figs. 11 and 12 are partial front elevations, with portions in section, showing different stages in the twisting operation.
Figure 12:
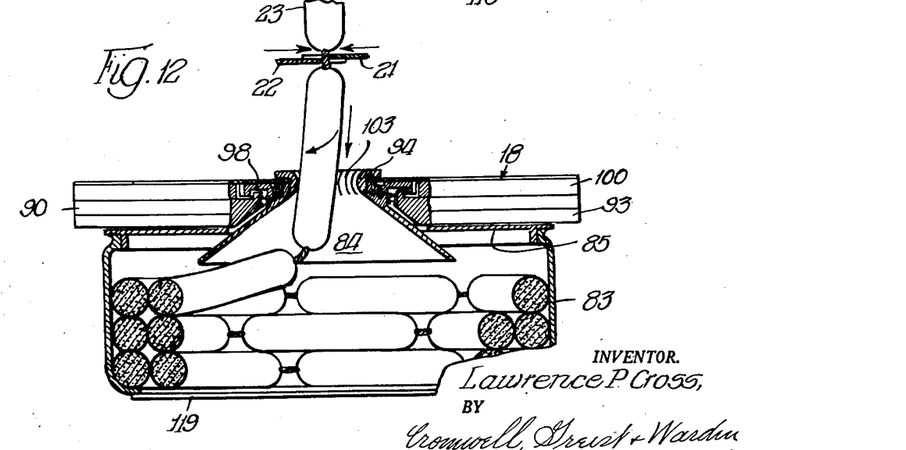

The movable portion of the dividing mechanism 11 is directly supported on the front plate 15 of the housing 10 and includes two rotatably and swingably mounted generally triangular heads 19 and 20, each of which carries adjacent the apexes thereof three forklike dividing fingers 21 and 22, respectively, which fingers are adapted to cooperate with each other in feeding and dividing the length of filled casing, indicated at 23 (Figs. 11 and 12).

Figure 10:
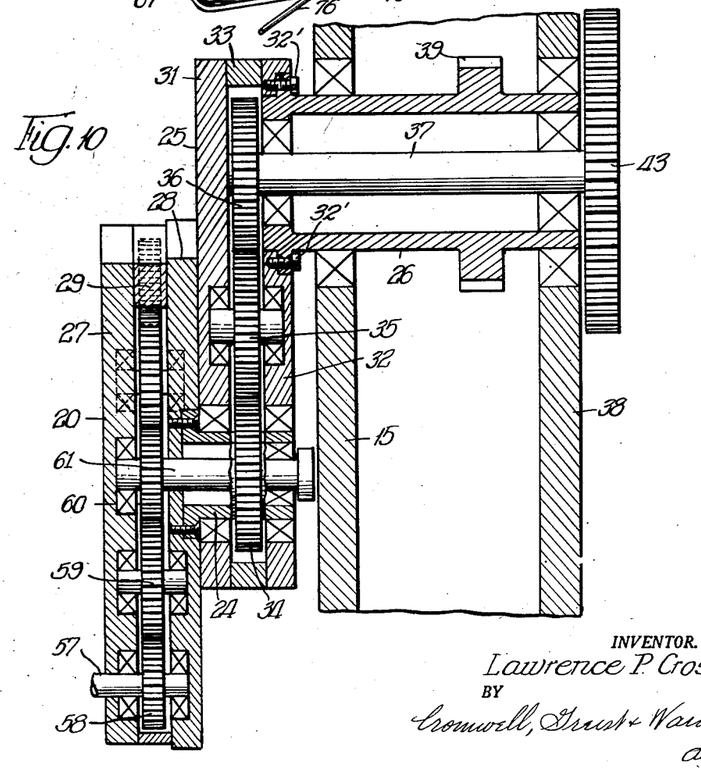
Fig. 10 is a detail section taken generally on the line 10—10 of Fig. 2, to an enlarged scale.

The heads 19 and 20 are identical in structure and are supported by means of pivot forming members 24 (Fig. 10) on identical swinging arms 25 which are in turn supported by means of pivot forming members 26 adjacent the top of the front plate 15. The heads 19 and 20 are arranged in opposed relation on opposite sides of the path of movement of the filled casing 23. The dividing fingers 21 and 22 are similar in structure and are arranged to engage in interfitting slidable relation to constrict the casing 23 at spaced intervals.

The structure and operating mechanism of head 20 will be described in detail, it being understood that the head 19 includes corresponding details of structure and operating mechanism. The head 20 consists of a front plate 27, a back plate 28 and a center plate member 29 secured in face-to-face relation. The back plate 28 is slightly larger than the center plate member 29 providing a relatively narrow outwardly bowed or outwardly extending track forming portion 30 which engages with a similar track formation on the opposed head 19 when the heads are rotated. The center plate member 29 is bored or recessed to accommodate controlling gears for the dividing fingers 22 which will be subsequently described.

The head 20 is secured to the pivot member 24 which consists of a flanged hollow shaft journaled in the lower end of supporting arm 25. The flanged end of shaft 24 is bolted or otherwise secured to the back plate 28 of the head 20. The supporting arm 25 comprises front plate 31, back plate 32 and center plate 33 which are secured in face-to-face relation to form an elongate casing. The center plate 33 is bored or recessed to accommodate a train of gears 34, 35 and 36. Gear 34 is secured on the hollow pivot shaft 24 which is journaled in the front and back plates 31 and 32 adjacent the free end of the arm 25. The intermediate idler gear 35 is journaled in the front and back plates 31 and 32 while the gear 36 is mounted on the front end of shaft 37 which extends through the pivot forming sleeve member 26 and is journaled in opposite ends of the latter.

Figure 5:
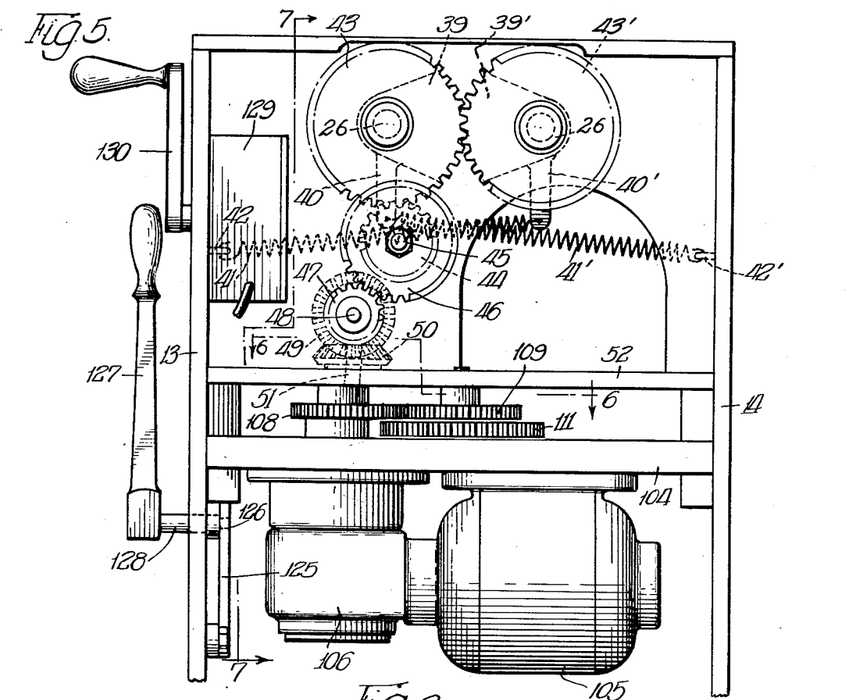
Fig. 5 is a rear elevation of the machine with the driving mechanism exposed.
Figure 6:
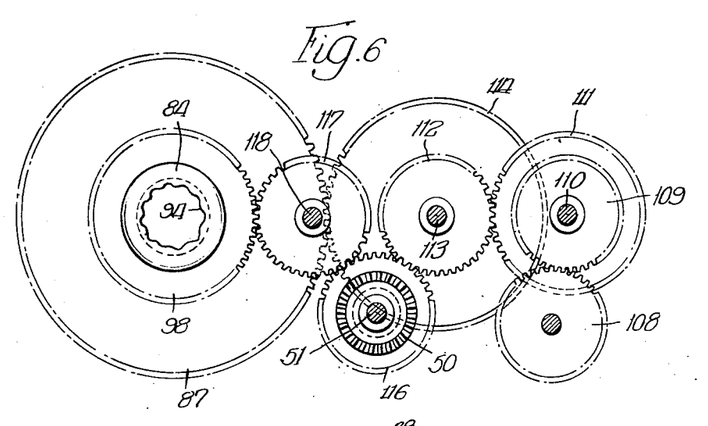
Fig. 6 is a section taken generally on the line 6—6 of Fig. 5 and to an enlarged scale showing portions of the driving mechanism.

The pivot sleeve 26 (Fig. 10) on which the head supporting arm 25 swings is journaled at opposite ends in the frame front plate 15 and an intermediate vertically extending frame plate 38 which extends between the frame side plates 13 and 14. The sleeve 26 is flanged at its forward end and secured by bolts 32' or otherwise to back plate 32. It is provided intermediate its ends with a gear segment 39 (Figs. 5 and 10) which engages with a corresponding gear segment 39' on the pivot sleeve 26 of supporting arm 25 for the head 19 to insure that the arms 25 will operate in timed relation as the heads 19 and 20 rotate. The gear segments 39 and 39' are provided with depending arms 40 and 40' which are connected to one end of tension springs 41 and 41', the other ends of the springs 41 and 41' being connected at 42 and 42' to the respective side walls 13 and 14 of the casing 10. The springs 41 and 41' urge the free ends of the arms 25 toward each other and insure constant contact between the heads 19 and 20 as they rotate.

The shaft 37 extends beyond the rear end of the pivot sleeve 26 and is provided on its inner end with a gear 43 which meshes with a corresponding gear 43' which forms a part of the drive mechanism for the other head 19. One of the gears 43 meshes with and is driven by a gear 44 mounted on a stub shaft 45 which extends rearwardly of the vertical frame plate 38. A somewhat larger gear 46 is mounted on the end of shaft 45 and engages with a gear 47 which is secured on a horizontal shaft 48. The shaft 48 is journaled in the vertical partition 38 and carries on its other end a bevel gear 49 in driving relation with a bevel gear 50 mounted on a vertically extending driven shaft 51 which is journaled in and projects upwardly from a horizontal frame partition 52. The gears 50, 49, 47, 46, 44 and 43 drive the shafts 37 and through the connected gears 34, 35 and 36 the heads 19 and 20.

Figure 4:
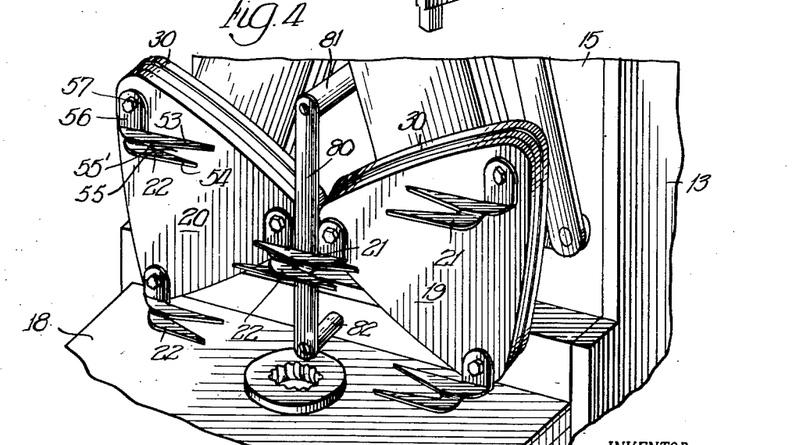
Fig. 4 is a perspective view to an enlarged scale of a portion of the machine showing the mechanism for dividing the filled casing.

The dividing members 21 and 22 on the heads 19 and 20 each comprises an elongate horizontally extending base plate (Fig. 4) which is divided by a generally V-shaped slot 55 into two horizontal projecting finger forming portions 53 and 54. The outer finger portion 54 is offset relative to the inner portion 53 in a horizontal plane a distance approximately equal to the thickness of the material of which the plate is formed. The outer finger portions 54 on the respective dividing members 21 and 22 are offset in opposite directions vertically so that when a divider member 21 on head 19 is brought into cooperative relation with a divider member 22 on head 20 the finger portions 53 and 54 will move into overlapping casing restricting relation. The V-shaped slots in the divider members 21 and 22 terminate at their inner ends in generally rounded or semi-circular recesses 55 of a diameter sufficient to accommodate the twisted portion between the respective links after the twisting operation. The finger forming portions are formed with rounded edges where they engage the filled casing to avoid cutting or otherwise damaging the casing during the constricting operation.

The casing dividing members 21 and 22 also each comprises a vertically extending attaching ear or lug 56 (Figs. 2 and 4) which is secured to a shaft 57 extending into the respective head 20 adjacent a corner or apex of the same. The shafts 57 on head 20 (Figs. 2 and 10) are rotatably journaled in the front and back plates 27 and 28 and have secured thereon small gears 58 which are engaged in driving relation with larger idler gears 59 journaled between the face plates 27 and 28. The idler gears 59 engage in driving relation with a relatively small central gear 60 which is mounted on a shaft 61. The shaft 61 is journaled in the front plate 27 and also the pivot sleeve member 24 of the head 20 with its inner end extending through the back plate 28 of the head 20 and the back plate 32 of the arm 25. The inner end of shaft 61 is secured to one end of a generally horizontal control link 62. The other end of the link 62 is pivoted at 63 to the lower end of a generally vertical control link 64 which is pivoted at its upper end at 65 to the frame face plate 15.

The intermediate plate 29 of the head 20 is recessed to receive the gears, shafts and bearings of the divider control mechanisms and the head plates 27, 28 and 29 are secured together in such a manner that the mechanisms within the head plates are protected from damage by water or the like which may be used to clean the machine while it is in use.

By means of the gear and linkage arrangement described, the divider members 21 and 22 are maintained in the same horizontal position relative to each other, regardless of the rotational position of the heads 19 and 20. As the heads 19 and 20 are rotated about their pivots 24 successive pairs of the divider members 21 and 22 are brought into cooperative relationship on opposite sides of the path of movement of the casing 23 to restrict the casing and divide the same into successive links of predetermined length.

Figure 9:
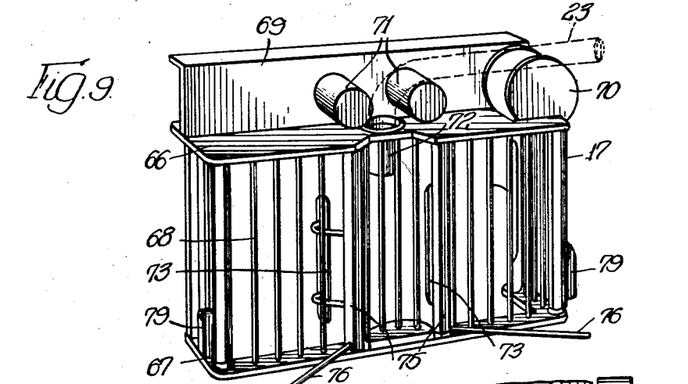
Fig. 9 is a perspective view of the front guard mechanism removed from the machine.

The fixed guard mechanism 17 (Figs. 1 and 9) which cooperates with the divider mechanism comprises top and bottom horizontal plate members 66 and 67 which are connected by a plurality of vertically extending rods 68 spaced along the outer margins of three sides thereof and forming a generally rectangular cage enclosing the divider heads 19 and 20 and the associated mechanisms. An angular plate member 69 extends upwardly of the top plate member 66 and carries at one end on the forward face a forwardly projecting guide roller 70 and intermediate its ends a pair of guide rollers 71.

The guide roller 70 is located adjacent an upper corner of the machine and receives the casing 23 in guiding relation as it is fed to the machine. The guide rollers 71 are located in laterally spaced relation near the vertical center of the machine and guide the casing 23 into a vertically arranged tubular guide member 72 extending downwardly through the top plate member 66.

A pair of vertically extending guide plates or bars 73 are mounted on arms 74 extending inwardly from vertical posts 75 which are pivoted in the upper and lower guard plates 66 and 67 on opposite sides of the path of movement of the casing 23. The posts 75 are provided with rod-like handles 76 at the base adjacent the plate 67 by means of which they may be rotated to move the guide plates 73 toward and from opposite sides of the path of the casing 23. The handle forming rods 76 extend laterally of the machine and are adapted to be engaged by latch members 77 (Fig. 1) which are pivoted at 78 on opposite side edges of the semi-circular shelf 18. The bottom plate member 67 of the guard mechanism 17 rests on the shelf 18 and the latch members 77 engage the rods 76 to hold the entire guard mechanism 17 in operative position on the front of the housing 10. The guard mechanism is provided with pivoted locking elements 79 which engage the tops of the latch members 77 when the latter are in latching position and prevent accidental removal of the guard mechanism.

A fixed guide plate or strip 80 is supported in vertical position on the forward face of the housing 10 (Fig. 4) by forwardly projecting upper and lower pins 81 and 82. The guide strip 80 is spaced forwardly of the dividing heads 19 and 20 and between the supporting flanges 56 of the divider members 21 and 22 when the divider members are in cooperative casing constricting relation.

The filled casing passes through the guide tube 72 which is arranged in aligned relation with the divider members 21 and 22 and is prevented from buckling by guide plates 73 and 80 while it is being constricted by the divider members 21 and 22 and moved downwardly by movement of the heads 19 and 20.

Figure 8:
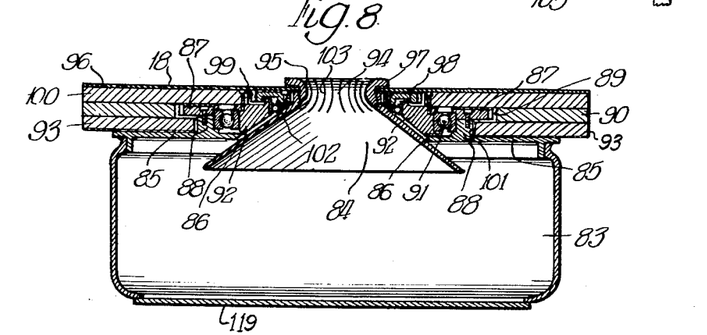
Fig. 8 is a section taken generally on the line 8—8 of Fig. 7.

The twisting and accumulating mechanism 12 is arranged below the dividing mechanisms 11 and is supported on the outwardly projecting semi-circular shelf or bracket formation 18. It comprises a rapidly rotating pan or receptacle 83 having peripheral side walls (Fig. 8) and a cone-shaped rotating distributor member 84 which extends into the same. The pan 83 and distributor cone 84 are both supported in rotatable relation beneath the shelf 18 with the top portion of the cone 84 extending through the shelf 18.

The pan 83 is secured at its upper margins to the depending flange of a circular top plate 85 which is provided with a central aperture 86 for accommodating the distributing cone 84. A ring gear 87 is secured to an upwardly projecting portion 88 on the upper surface of the top plate 85 surrounding the aperture 86 and projecting through a central aperture 101 in the bottom plate 93 of the shelf 18. The ring gear 87 is housed in a recess 89 provided in an intermediate plate 90 forming part of the shelf 18. The gear 87 and plate 85 are supported on bearings 91 located in the outer face of a bearing supporting ring 92 secured in depending relation from an upper plate 100 which also forms part of the shelf 18.

The cone distributor member 84 comprises an outwardly flaring bottom portion which extends through the aperture 86 into the pan 83 and the upper restricted throat forming portion 94 which is secured thereon in screw-threaded relation and extends upwardly through a central aperture 95 in the top or cover plate member 96 of the shelf 18, terminating in an outwardly extending flange 97 which overlies the edge of the latter. The cone 84 has secured thereto adjacent the throat member 94 an outwardly projecting ring gear 98 which is received in a recess 99 in the upper plate 100. The cone 84 and the ring gear 98 are supported in rotatable relation by bearing 102 secured on the inner face of the bearing supporting ring 92. The restricted throat formed by member 94 is of greater diameter than the cross sectional diameter of the links (Figs. 8, 11, 12) and is provided with a series of circumferentially spaced vertically extending corrugations 103 for a purpose which will be described.

Figure 7:
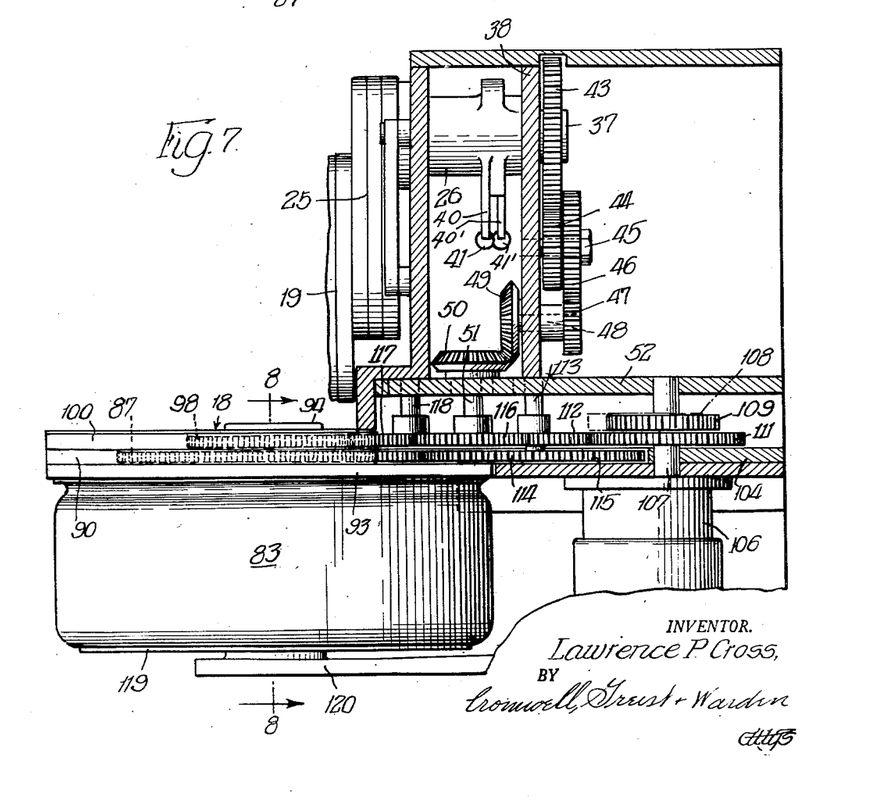
Fig. 7 is a section taken generally on the line 7—7 of Fig. 5, with portions broken away.

The intermediate and lower plate members 90 and 93 of shelf 18 extend inwardly of the housing 10 (Fig. 7) and form a lower or bottom horizontal partition member 104 in spaced relation to the horizontal partition member 52 in the housing 10.

The ring gears 87 and 98 are arranged in concentric relation and are rotated by a drive mechanism which also operates the dividing mechanism 11. A driving motor 105 is supported beneath the partition 104 and is drivingly connected with a speed reduction device 106 also secured beneath the partition 104, the latter having its drive shaft 107 extending vertically through the partition members 52 and 104. The drive shaft 107 carries a gear 108 which engages in driving relation with the gear 109 on the vertical shaft 110 which is journaled in the upper and lower plates 52 and 104 and which also carries a larger gear 111. The gear 111 engages in driving relation with a somewhat smaller gear 112 which is mounted on a shaft 113 journaled in the upper and lower plates 52 and 104. The shaft 113 carries a large gear 114 which is received in the recess 115 provided in the plate 104 and which engages in driving relation with the ring gear 87 on the pan 83 to rotate the pan 83. The small gear 112 on the shaft 113 engages in driving relation with a gear 116 which is mounted on the bottom of the shaft 51 depending from the partition member 52. The shaft 51 provides power for operation of the heads 19 and 20 as previously described. The gear 116 engages in driving relation an idler gear 117 which is mounted on the shaft 118 depending from partition member 52. The gear 117 is in driving relation with ring gear 98 which rotates the distributing cone member 84. The speed of rotation of the cone member 84 is less than the speed of rotation of the pan 83 by a predetermined amount which is so related to the length of the twisted sausage links that the latter are deposited in coil fashion around the periphery of the pan 83 (Figs. 11 and 12).

The pan 83 is provided with a bottom member 119 which is rotatably supported on a swingable plate 120. The plate 120 is pivoted to the side wall 13 of the housing 10 at 121 and is adapted to swing downwardly away from the bottom of the pan 83. The movement of the plate 120 is controlled by a linkage mechanism which comprises L-shaped link 122 which is pivoted at one end at 123 intermediate the ends of the supporting plate 120 and at its other end at 124 to the end of a short arm 125 which is secured at its other end at 126 to an operating arm 127 by means of a relatively short connecting shaft 128 which is journaled in the side plate 13 of the housing 10. The pivot points 123, 124 and 126 are so arranged that when the handle 127 is in the upright position (Figs. 1 and 3) the pan bottom 119 is closed against the pan 83 and latched in the closed position due to the location of pivot point 124 relative to pivot points 123 and 126. In order to swing the pan bottom 119 away from the pan 83, the handle 127 is moved forwardly about the pivot point 126 to move pivot point 124 in an arc forwardly and downwardly about the pivot point 126, forcing the plate 120 downwardly about the pivot point 121 by movement of link 122 and arm 125.

The drive motor 105 which provides the operating power for the machine is controlled by a conventional switch arrangement indicated at 129 which is operated by a handle 130 so that the machine may be readily stopped and started by the operator.

In operating the machine, a predetermined length of casing 23 which has been filled within the sausage or other material is fed into the machine over the guide rollers 70, 71, the casing being guided between the pair of rollers 71 and through the guide tube 72 into position for engagement by cooperating pairs of dividers 21 and 22. The filled casing moves downwardly through the passageway formed by the guide plates 73 and 80 between the heads 19 and 20 and is divided into a series of successive sections or links by successive engagement of the pairs of dividers 21 and 22.

The rotation of the heads 19 and 20 is continuous and at a relatively rapid and uniform rate while the dividers 20 and 21 move vertically and horizontally at varying rates of speed. The divider finger forming portions 53 and 54 are maintained by the linkage 62, 64 and the connected control gears in a horizontal position throughout their complete cycle of movement. As the respective dividers 21 and 22 are moved toward each other by rotation of the heads 19 and 20, the finger portions 53 and 54 are moved into overlapping interfitting sliding relation, being engaged with each other from opposite sides of the casing 23 and constricting the casing between them. The finger portions 53, 54 along the slots 55 are rounded on the edges to prevent injury to the casing as they move into encompassing relation to the same.

As the dividers 21 and 22 move toward each other into closely constricting relation with the casing they also move downwardly carrying the casing with them. When the dividers 21, 22 are in approximately the position shown in Figs. 2 and 11, their rate of travel in the vertical direction is very small, permitting the material in the casing to be pushed by the constriction of the casing in both directions lengthwise of the casing. At this point the top dividers 21 and 22 (Figs. 2 and 11) are not quite together, while the bottom pair of dividers which have performed the preceding constricting operation have begun to separate or move apart at the bottom end of the link which is being formed, as illustrated in Fig. 11, particularly, where the direction of movement of the members is indicated by arrows. The top dividers 21 and 22 reach the limit of their movement toward each other when the bottom dividers are opened sufficiently for a stuffed portion of the casing to pass through the latter and before the twisted portion of the casing just released reaches the corrugated or grooved area 103 of the throat of the cone 84. The top dividers remain in closed position (Fig. 12) as they travel downwardly in front of the guide plate 80, the small section of casing which has been constricted being confined to its smallest constricted or cross-sectional area, while the twist is imparted to the area by operation of the twister mechanism 12. The dividers 21 and 22 begin to separate and move apart as they descend to the lowermost position as shown in Fig. 11, thereafter moving apart very rapidly and releasing the lower end of the link which is being formed.

Due to the manner in which the heads 19 and 20 are moved and the curved configuration of the track portion 30 which determines the movement of the dividers 21 and 22, the link being formed or divided from the casing 23 is at no time completely confined between the successive pairs of dividers 21 and 22. The uppermost pair of dividers is not completely closed when the lowermost pair of dividers begin to open. The link is free to contract lengthwise at all times while it is being formed. When the upper pair of dividers close completely and reduce the constricted portion of the casing to its smallest cross-sectional area the lowermost dividers are separated and the lower end of the link is subjected only to the pull of the preceding links. The finished length of the link is less than the distance between the successive pairs of dividers 21 and 22 when they are in vertical alignment and in engagement with the casing because of the reduction in length resulting from the twisting operation.

The twisting of each link begins as the dividers move the casing downwardly and the lower end of the link being formed is advanced into the throat forming member 94 and engaged with the corrugations 103. The preceding links are drawn by centrifugal force due to the rapid rotation of the pan 83 outwardly of the pan 83 and pull the end of the link being formed against the throat 94 to start the twist. At this point in the operation the uppermost dividers 21 and 22 have come together and are moving at a relatively slow rate downwardly. As the link being twisted moves freely through the throat 94 adjacent the axis of rotation of the pan 83, guided by the throat 94, the twisting operation is completed by the rotation of the preceding links due to the centrifugal force resulting from the rotation of the pan 83. The cone 84 tends to distribute the links as the twisting operation proceeds and guides them into coil formation or arrangement around the periphery of the pan 83 as illustrated in Figs. 11 and 12. As the twist is completed by the rotation of the pan and the centrifugal pull on the link, the dividers 21 and 22 complete their downward movement and are rapidly separated by the rotation of the triangular shaped heads 19 and 20.

The successive twisted links are collected in coil formation in the pan 83. When the length of casing being operated on is completely divided by the machine into a plurality of the twisted links the motor is stopped and the operator moves the handle 127 forwardly to lower the bottom 119 of the pan 83 and thereby dropping the coil of links out of the pan and freeing it for removal from the bottom 119.

I claim:

1. A method of forming from a relatively long length of stuffed casing a series of individual links of uniform length which are separated from each other by twisted casing sections, which method comprises advancing the casing along a predetermined path while constricting the casing at intervals to divide the same into link forming portions of uniform length, guiding the successive link forming portions in a continuously moving stream through a relatively small passageway and into coil forming relation while rapidly rotating the coil formed by preceding links, whereby each successive link is axially rotated as it moves through the passageway to form a twist in the casing section between it and the next succeeding link, and the twisted links are caused to move radially outwardly of the passageway a predetermined distance and to arrange themselves in the coil formation due to the centrifugal pull exerted on the links as they emerge from the passageway by the rapid rotation of the preceding coiled links.

2. A method of forming a length of filled casing into a series of individual links which are separated from each other by twisted sections of the casing, which method comprises continuously advancing the filled casing in a predetermined path, constricting the casing at intervals without interrupting its movement, whereby to preliminarily divide the filled casing into individual links of predetermined length, guiding the successive links without interruption through a free and unobstructed passageway of slightly larger diameter than the diameter of the casing, axially rotating each individual link as it advances through the passageway, guiding the previously twisted links radially outwardly of the axis of rotation and causing the twisted links to arrange themselves in an open coil formation, the coiled links being rotated at a sufficiently high rate of speed to exert a centirifugal pull on the succeeding links and cause them to move outwardly away from the passageway and into the coil formation.

3. A method of forming a length of filled casing into a series of individual links which are separated from each other by twisted sections of the casing, which method comprises continuously advancing the filled casing in a predetermined path, constricting the casing at intervals without interrupting its movement, whereby to preliminarily divide the filled casing into individual links of predetermined length, guiding the successive links without interruption through a free and unobstructed passageway which passageway is slightly larger in diameter than the diameter of the casing, rotating each individual link about its own axis as it advances through the passageway to impart a twist between it and the next succeeding link, guiding the twisted links in a radial path outwardly away from the passageway and then into a circular path to cause the links to form a coil, and rotating the coil at a high rate of speed about an axis which is located adjacent the passageway, whereby the successive links are twisted and thereafter the links are held in coil formation.

4. A method of forming from a relatively long length of stuffed casing a series of individual links which are separated from each other by twisted casing sections, which method comprises continuously advancing the casing along a predetermined path while constricting the casing at intervals to divide the same into link forming portions of uniform length, guiding the successive link forming portions in a continuously moving stream through a relatively small passageway, axially rotating each successive link at it moves through the passageway to form a twist in the casing section between it and the next succeeding link and accumulating the twisted links in a coil by rotating the preceding coiled links about an axis adjacent the passageway and at a high rate of speed sufficient to exert a centrifugal pull on the links which will move the same in a radial direction outwardly away from the passageway, while limiting the movement of the links in the radial direction, whereby to cause the links to arrange themselves in coiled relation.

5. A method of forming from a relatively long length of stuffed casing a series of individual links of uniform length which are separated from each other by twisted casing sections, which method comprises continuously advancing the casing endwise, constricting the casing at intervals while it is being advanced, whereby to divide the casing into link portions, directing each of the thusly divided continuously advancing link portions laterally into a rapidly revolving open-centered coil formed from the preceding link portions, in which coil the link portions are held by centrifugal force against movement relative to each other, and utilizing the end connection of each laterally directed link portion with the revolving link portions preceding it in the coil to effect rotation of the laterally directed link portion relative to the succeeding link portion, whereby to twist the casing therebetween.

References Cited in the file of this patent

FOREIGN PATENTS 20,096    Great Britain _________________ 1912